United States Patent
Armstrong et al.

(10) Patent No.: US 7,512,826 B2
(45) Date of Patent: Mar. 31, 2009

(54) METHOD, APPARATUS, AND PRODUCT FOR AN EFFICIENT VIRTUALIZED TIME BASE IN A SCALEABLE MULTI-PROCESSOR COMPUTER

(75) Inventors: William Joseph Armstrong, Rochester, MN (US); Michael J. Corrigan, Rochester, MN (US); Naresh Nayar, Rochester, MN (US); Scott Barnett Swaney, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 11/110,180

(22) Filed: Apr. 20, 2005

(65) Prior Publication Data

US 2006/0242442 A1 Oct. 26, 2006

(51) Int. Cl.
G06F 1/12 (2006.01)
(52) U.S. Cl. ...................................... 713/375; 713/400
(58) Field of Classification Search ................. 713/375, 713/400

See application file for complete search history.

(56) References Cited

U.S. PATENT DOCUMENTS 5,235,539 A * 8/1993 Patel .......................... 708/713
6,195,740 B1 * 2/2001 Heishi et al. .................. 712/24
2004/0068642 A1 * 4/2004 Tanaka et al. ............... 712/223
2004/0205368 A1 * 10/2004 Lange-Pearson et al. ..... 713/400
2005/0066211 A1 * 3/2005 Heinrich et al. ............. 713/375

* cited by examiner

Primary Examiner—Tse Chen
(74) Attorney, Agent, or Firm—Duke W. Yee; Diana L. Roberts-Gerhardt; Lisa L. B. Yoeiss

(57) ABSTRACT

A method, apparatus, and computer program product are disclosed in a data processing system for providing a virtualized time base in a logically partitioned data processing system. A time base is determined for each one of multiple processor cores. The time base is used to indicate a current time to one of the processor cores for which the time base is determined. The time bases are synchronized together for the processor cores such that each one of the processor cores includes its own copy of a synchronized time base. For one of the processor cores, a virtualized time base is generated that is different from the synchronized time base but that remains synchronized with at least a portion of the synchronized time base. The processor core utilizes the virtualized time base instead of the synchronized time base for indicating the current time to the processor core. The synchronized time bases and the portion of the virtualized time base remaining in synchronization together.

13 Claims, 9 Drawing Sheets

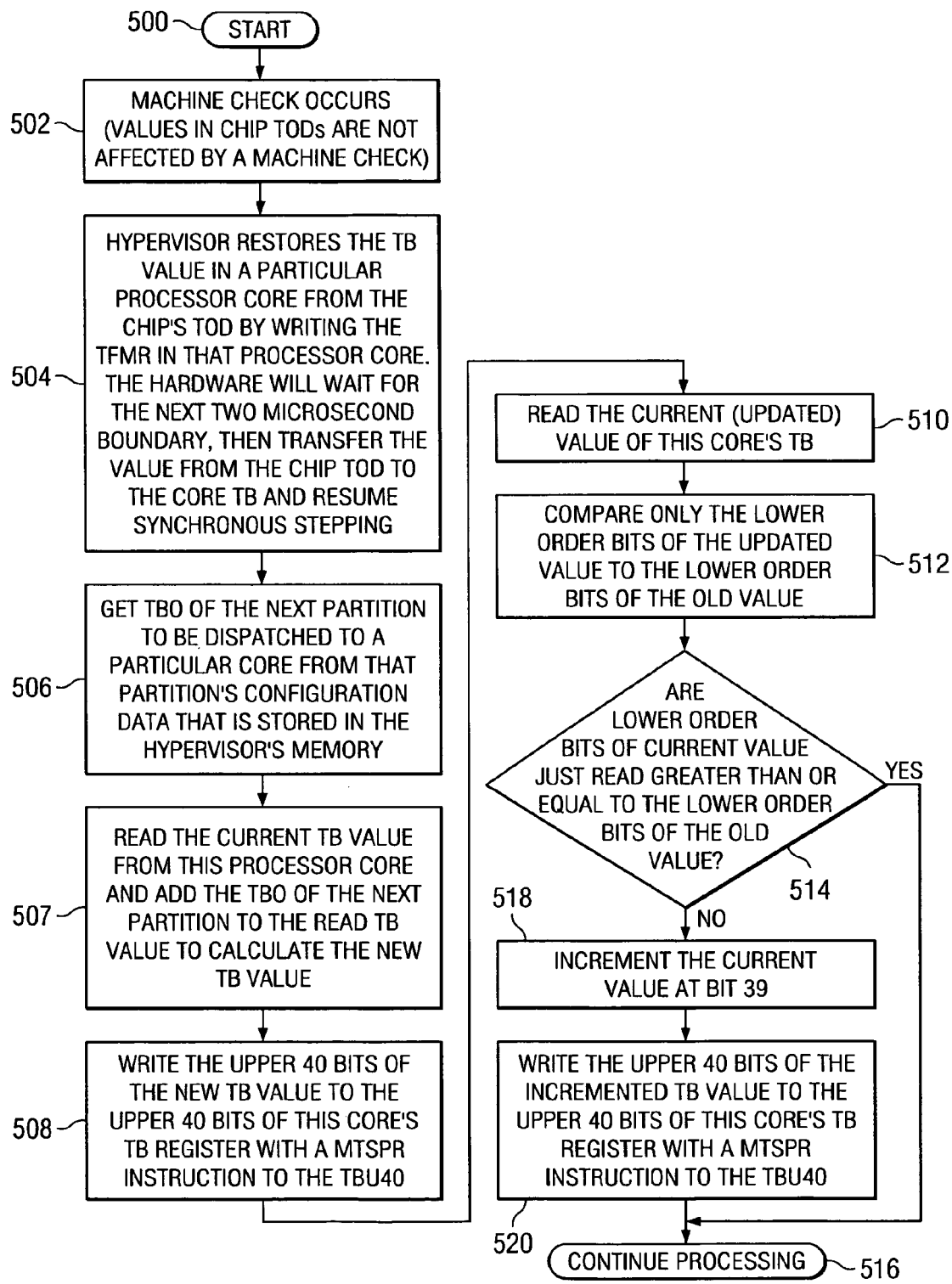

METHOD, APPARATUS, AND PRODUCT FOR AN EFFICIENT VIRTUALIZED TIME BASE IN A SCALEABLE MULTI-PROCESSOR COMPUTER

BACKGROUND OF THE INVENTION

1. Technical Field

The invention relates to the field of multiprocessor systems, and more specifically to a method, apparatus, and product for providing an efficient virtualized time base in a scaleable multi-processor computer system.

2. Description of Related Art

A symmetric multiprocessing (SMP) data processing system has multiple processor cores that are symmetric such that each processor core has the same processing speed and latency. An SMP system has one operating system that divides the work into tasks that are distributed evenly among the various cores by dispatching one software thread of work to each processor core at a time. Thus, a processor core in an SMP system executes only one thread at a time.

A simultaneous multi-threading (SMT) data processing system includes multiple processor cores that can each concurrently execute more than one thread at a time per processor core. An SMT system has the ability to favor one thread over another when both threads are running on the same processor core.

Known systems can include one or more shared processor cores where the shared processor cores are shared among the various processes that are being executed by the system. The processor core may be an SMT processor core. A shared processor core may be part of a logically partitioned system and shared among the various partitions in the system. The number of virtual partitions and the amount of system capacity allocated to each partition may be defined or modified at boot time by the system operator.

These systems typically include firmware, also called a hypervisor, that manages and enforces the partitioning and/or sharing of all the processor cores in the system. For example, a hypervisor may dispatch a virtual partition to one or more physical processor cores. The virtual partition includes a definition of the work to be done by each physical processor core as well as various settings and state information that are required to be set within each physical processor core in order for the physical processor core to execute the work. Thus, each virtual partition can be a "virtual" SMP system.

In known shared processor systems, the hypervisor supervises and manages the sharing of each physical processor core among all of the logical partitions. The hypervisor assigns a dispatch time slice to each logical partition. The hypervisor will service all of the logical partitions by dispatching logical partitions to the physical processor cores. The hypervisor services the logical partitions by granting time to each logical partition during which the logical partition will be executed on one or more of the physical processor cores. The hypervisor may dispatch more than one logical partition at the same time to different groups of physical processor cores.

Each logical partition will be defined by particular configuration data that is needed by a physical processor core to process that logical partition. The configuration data includes particular data, register values, states, settings, and information. All of the configuration data is stored by the hypervisor in the hypervisor's memory. When a particular logical partition is to be dispatched to a physical processor core, the hypervisor will retrieve the configuration data for that partition, restore all the settings to the registers and state in the processor core, and resume processing from the point that the partition was last suspended. Once the time slice that was granted to that physical partition has expired, the hypervisor will save the current values for all of the configuration data back into its memory to be retrieved at a later time for further processing of the logical partition.

Each processor core includes its own Time Base (TB) register. The TB register is a free-running 64-bit register that increments at a constant rate so that its value represents relative time. The TB registers are initially synchronized across all processors in an SMP system so that all processors in the system have the same relative time. The time indicated by the TB register is the time that has elapsed since the machine was restarted.

The TB register is a shared resource across all threads in a multi-threaded processor, and the constant rate that it increments, is known to software executing on each thread. The hypervisor also maintains a Real-Time Offset (RTO) for each logical partition. The RTO is the wall-clock time at the time when the TB started incrementing from zero. The RTO remains static until updated by the hypervisor.

The hypervisor can convert the TB value to a current wall-clock time by multiplying the period of the TB increment by the TB value, and adding the RTO. The hypervisor maintains the RTO as part of the configuration data for each partition. When operating system software wants to change its wall-clock time, it informs the hypervisor, and the hypervisor simply modifies the RTO for the partition, it does not modify the hardware TB. Often software tasks only require relative time, which can be determined simply by reading the current value stored in the TB.

A logical partition may be dispatched simultaneously to one or more physical processor cores. These processor cores may be located within the same chip, or within different chips in the same machine. In addition, a logical partition may be dispatched to a particular processor core at one time and then dispatched to a completely different processor core at a later time. The two processor cores may be located within the same chip, or within different chips in the same machine.

A partition obtains the current relative time by reading the value that is currently stored in the TB register of the processor core that is currently executing the partition. If a partition is suspended and then resumed on a second processor core, the partition will obtain the current relative time using the value that is stored in the TB register included within the second processor core.

Software running in different logical partitions is allowed to have different wall-clock times, but all threads in all partitions must always observe time to be advancing, both wall-clock time and relative time. Small forward jumps in time are allowable, but backward jumps are not.

The TB registers must be synchronized across all physical processors which are executing the same logical partition, since the operating system or dispatched processing threads could read the TB from the different processors running the partition, in any order, and must always observe time to be advancing. Since all processors running the same partition must have their TB registers synchronized, and the hypervisor can dispatch any logical partition to any physical processors in the machine, the TB registers must be synchronized across all processor cores in the entire machine.

Since the TB registers are synchronized across all processors within the same machine, a suspended logical partition which is resumed on a different processor in the same machine would see a forward jump in time by the amount of time that the partition was suspended. The time slices allocated for dispatching partitions will keep this forward jump acceptably small.

If the TB registers were not synchronized, then resuming a suspended partition on a processor with a different TB value could appear as a large forward or backward jump in time, which is not allowed by the architecture. Because the TB in processor cores in different machines generally have different values, a limitation of the prior art is that logical partitions are limited to running on processors within the same machine. It is desirable to be able to suspend and resume logical partitions on the same or a different machine.

With the prior art, permitting each logical partition to change the value of the TB in all of its processor cores every time it is dispatched is not an acceptable situation. If a TB value in one core in a partition is changed, the values of all of the TBs in that partition will no longer all be synchronized to each other. The values in the TBs would need to be resynchronized to each other by suspending all partitions that are executing in the machine, stopping all TB values from moving forward, updating the required TB values in the other cores running that partition, restarting counting by all time bases, then resuming all partitions. This approach is unacceptable because it affects the performance of the machine since the processing of the logical partitions is suspended, and it results in an apparent drift in time between this machine and other machines and clocks due to the frequent pausing of the TB registers.

One possible solution would be to have the hypervisor firmware intercept all software accesses to the TB via an interrupt, and apply an additional offset which is maintained by the hypervisor for each partition. However, this would negatively impact performance due to the overhead of handling an interrupt for every access to the TB.

Therefore, a need exists for a method, apparatus, and product for a virtualized time base in a scalable multiprocessor system which provides precise monotonically non-decreasing time synchronization across all software threads in a logical partition when suspended and resumed on the same or a different machine, while maintaining real time correlation to other machines or clocks.

SUMMARY OF THE INVENTION

A method, apparatus, and computer program product are disclosed in a data processing system for providing a virtualized time base in a logically partitioned data processing system. A time base is determined for each one of multiple processor cores. The time base is used to indicate a current time to one of the processor cores for which the time base is determined. The time bases are synchronized together for the processor cores such that each one of the processor cores includes its own copy of a synchronized time base. For one of the processor cores, a virtualized time base is generated that is different from the synchronized time base but that remains synchronized with at least a portion of the synchronized time base. The processor core utilizes the virtualized time base instead of the synchronized time base for indicating the current time to the processor core. The synchronized time bases and the portion of the virtualized time base remaining in synchronization together.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a high level flow chart that illustrates a process that is executed by a particular machine's hypervisor to adjust the TB value in a processor core to the relative time that is associated with a particular partition which is resumed on the processor after the occurrence of a machine check in accordance with the present invention;

DETAILED DESCRIPTION OF THE PREFERRED EMBODIMENT

Figure 1:
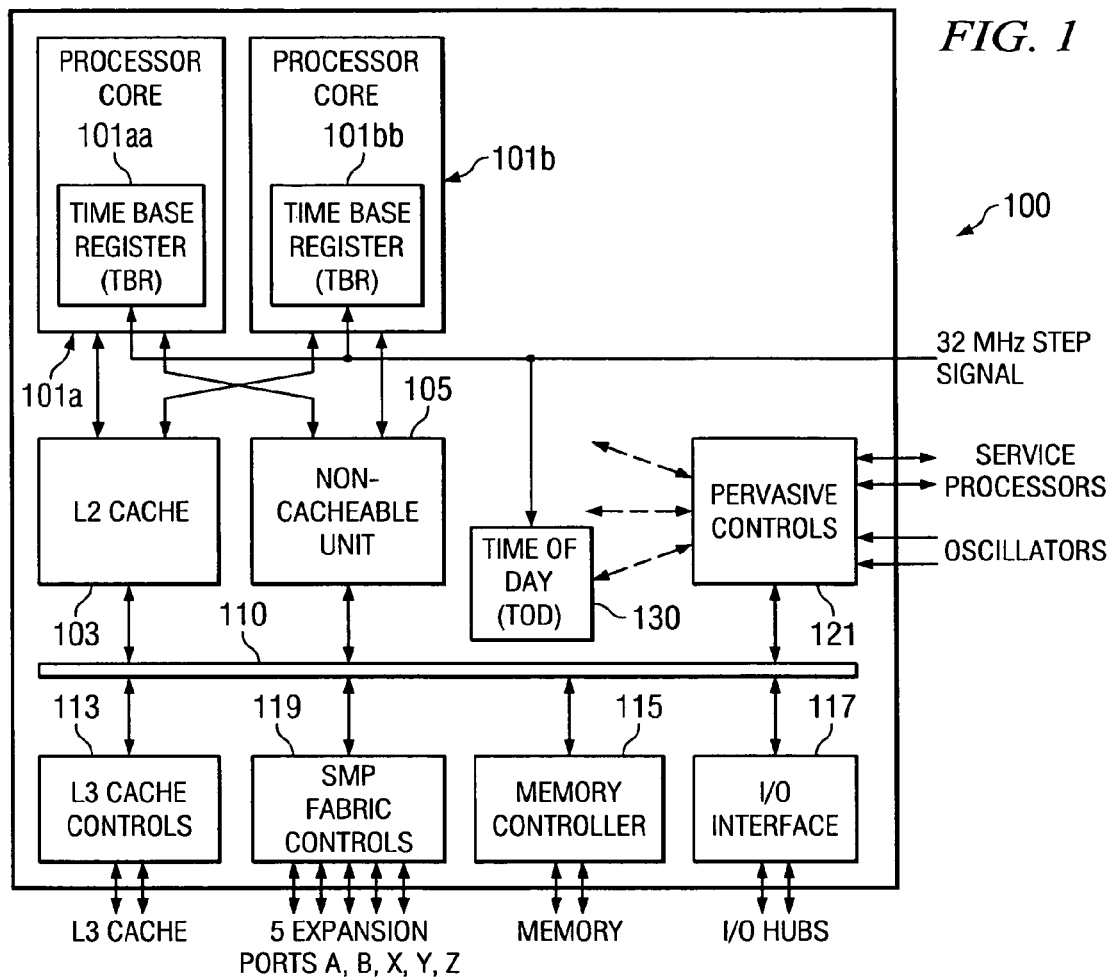
FIG. 1 depicts a chip having multiple processor cores in the chip in accordance with the present invention.

A preferred embodiment of the present invention and its advantages are better understood by referring to the figures, like numerals being used for like and corresponding parts of the accompanying figures.

The present invention provides precise monotonically non-decreasing time synchronization across all software threads in a logical partition when the partition is suspended and resumed on the same or a different machine while maintaining real time correlation to other machines' time or other clocks.

Each multiple core processor chip maintains its own time of day (TOD) register which is synchronized across all processor chips in a machine. Each processor core in a processor chip includes its own time base (TB) register. The value in each TB in each processor core in a chip is initially synchronized to the TOD register in that chip. This synchronization is done by a state machine in the hardware in response to the hypervisor writing a bit in the Timer Facilities Management Register (TMFR) via a Move To Special Purpose Register (MTSPR) instruction. The TFMR is a special purpose register. The synchronization is accomplished using a 32 MHz step signal that is received by all chip TODs in the system at the same time, and forwarded from the chip TOD to the TBs in the processor cores in the same chip. The 32 MHz step signal has a period of 0.03125 microseconds, which corresponds to bit 59 of the TB in the preferred embodiment.

Two microseconds corresponds to bit 53 of the TB register, so on every 2.0 microsecond boundary, bits 54:63 of the TB will be zeros. When the hypervisor writes to the TFMR, the hardware waits for the next 2 microsecond boundary and then starts stepping, using the 32 MHz step signal, bits 54 to 59 of the TB value from zero while bits 0 to 53 of the TB are loaded from the chip's TOD value. This re-synchronization between the TBs and the chip's TOD can be performed at any time during steady state operation (e.g. after a machine check).

Since the TODs in all of the chips in a machine are synchronized to each other and the TB registers in a chip are initially synchronized to their chip's TOD, the TB registers are also initially synchronized to each other across the entire machine. Once initially synchronized, the TB register values in each processor core are incremented by the synchronous 32 MHz step signal forwarded from the chip's TOD. Thus, all TB registers also step at the same time to maintain precise relative time synchronization.

The relative time in the TB is converted to wall-clock time for a partition by multiplying the TB value by its increment period and adding the RTO for the partition. The RTO is the wall-clock time for a partition when the relative time in the TB was zero. Different logical partitions may obviously have different wall-clock times set, but since different machines are likely started at different times, partitions with the same wall-clock time but on different machines likely have different relative times. For a simplified example, suppose partitions in 2 different machines have a wall-clock time of 4:00 pm. The first machine may have been started at 1:00 pm, so the partition on the first machine would have a RTO of 4:00 pm and a relative time of 3 hours represented in its TB. The second machine may have been started at 3:00 pm, so the partition on the second machine would have a RTO of 3:00 pm and a relative time of 1 hour represented in its TB. In this example, if the partition on the second machine were suspended and then resumed on the first machine for processing, time will appear to the partition to be going backward from 4:00 pm to 2:00 pm. This is because the TB register in the processor core that was executing the partition in the second machine included a value that indicated a relative time of 3 hours while the TB register in the processor core that will be executing the partition in the first machine includes a TB value that indicates a relative time of 1 hour. Since the partition obtains the current relative time from the TB register on which it is being executed, the partition will see time going backward from 4 pm to 2 pm. It is necessary to prevent a partition from observing time going backward.

The present invention is a method, apparatus, and product that provides a virtualized time base in a scalable multiprocessor system where software executing in a logical partition always sees time moving forward regardless of which processor core in which system is chosen to process a particular logical partition.

The software and operating system that are executing in a logical partition obtain the current relative time using the value that is currently stored in the TB register that is included in the processor core that is executing the partition.

In addition, the present invention provides for a time base offset (TBO) that is calculated for each logical partition by the hypervisor and stored in the configuration data for each logical partition. The TBO represents the difference between the TB of the machine where that a partition was first created and the TB of the machine that the partition is currently running on.

Each TB value is preferably a 64-bit value. The precision of the 64-bit value increases from upper bits to lower order bits such that the lower order bits represent the most precise time. The lower order bits are preferably bits 40-63 while the upper order bits are bits 0-39. In the preferred embodiment, bit 53 represents 2.0 microseconds, and bit 39 represents 32.768 milliseconds (0.032768 seconds).

Each TBO is preferably a signed 40-bit value, so that it can represent a positive or negative number. The 40 bits of the TBO represent the same resolution as the upper 40 bits of the TB value. The units of the TBO correspond to the amount of time represented by bit 39 of the TB, which is 32.768 milliseconds. For example, the hexadecimal value of a TBO which represents one hour is 0×000001AD27. The signed value uses standard twos compliment, so the hexadecimal value of a TBO which represents negative 1 hour is 0×FFFFFE52D9.

When the hypervisor creates a new logical partition, the TBO value is zero. As long as the logical partition is only dispatched on the same machine where it was originated, the TBO will remain zero. If the logical partition is migrated to a different machine, the TBO will need to be adjusted to run on that different machine.

For a simplified example, assume a first machine is operating at a relative time of 1 hour after it was restarted, a second machine is operating at a relative time of 3 hours after it was restarted, and a third machine is operating at a relative time of 6 hours after it was restarted. If a first logical partition that was originally created on the second machine is suspended on the second machine and resumed on the first machine, the TBO that is calculated for the first logical partition running on the first machine represents two hours because the second machine is operating at two hours after the first machine.

If a second logical partition that was originally created on the third machine is suspended on the third machine and resumed on the first machine, the TBO calculated for that second logical partition running on the first machine represents five hours because the third machine is operating at five hours after the first machine.

If the second logical partition that originated on the third machine is then suspended on the first machine and resumed on the second machine, the TBO must be re-calculated. The TBO for the second logical partition no longer represents 5 hours, it is re-calculated to represent three hours because the third machine is operating at three hours after the second machine.

The TBO is a signed value. Thus it can represent a positive number or a negative number. For example, if a third logical partition that originated on the first machine is suspended on the first machine and resumed on the third machine, the TBO that is calculated for that third logical partition represents negative five hours because the first machine is operating at five hours before the third machine.

If a partition is suspended and resumed on a different machine, the hypervisor on the new machine will receive the configuration data for that partition. The configuration data in this case will include the TBO that was stored in the partition's configuration data by the first machine. In addition, when the hypervisor in the first machine sends a partition to another machine for execution, the first machine also sends the current value of the TB register for the processor core that was last executing the partition. Thus, the hypervisor in the second machine calculates a new TBO value from its own data and the partition's configuration data as well as the TB value that was passed to the second machine from the hypervisor on the originating machine.

Following the one of the examples given above, assume that the second logical partition originated on the third machine. When the partition is originated, it has a TBO of zero. As long as the second partition continues to be processed by a processor core within the third machine, the partition's TBO will remain zero. If the second partition is suspended on the third machine and resumed on the first machine, the hypervisor in the third machine will send the partition's configuration data to the first machine.

This partition configuration data will include a TBO of zero because the partition had been executed on the machine in which it was originated. In addition, the hypervisor in the third machine will also send the value of the TB register of the core that was last executing the second partition. That TB register value will indicate that the relative time in that core in the third machine was 6 hours.

The hypervisor in the first machine will then calculate a new TBO value for the second partition. The hypervisor in the first machine will use its own data to determine that the first machine has a relative time of 1 hour. The hypervisor in the first machine will analyze the TBO it received in the second partition's configuration data as well as the TB value that it received from the third machine. The hypervisor in the first machine will then determine that the new TBO should represent 5 hours. The hypervisor in the first machine will then store this new TBO value in the partition's configuration data as the current value of the TBO for the second partition.

A suspended logical partition is resumed on a processor by retrieving the logical partition's configuration data from the hypervisor's memory, and restoring all architected register values and state in each processor core that was selected to process the logical partition. This configuration data includes a time base offset (TBO) value. The hypervisor applies the newly dispatched partition's TBO to the TB of each processor core that was selected to process the logical partition. The following paragraphs explain how the TBO is applied to the TB.

Before a suspended partition may be resumed on the chosen processor cores, the partition currently executing on those same processor cores must first be suspended. Suspending a partition includes extracting all architected register contents and other state required to later resume executing the partition, and saving the data to a hypervisor memory area allocated for that partition. The partition being suspended would have already had its TBO applied to the TB in each processor core processing the partition.

When a partition is resumed, the hypervisor must take into account the TBO from the old partition when applying the TBO for the new partition to the TB register. The hypervisor reads the current value of the TB register with a Move From Special Purpose Register (MFSPR) instruction. The hypervisor then adds the difference between the TBO of the old partition and the TBO of the new partition to the value read from the TB register, and writes the result to only the high order bits of the TB register using a MTSPR instruction. A new SPR number, mnemonic TBU40 (Time Base Upper 40), is assigned to indicate just the high-order 40 bits of the TB register. Assigning a new mnemonic (SPR number) for the upper 40 bits of the TB allows the processor core hardware to distinguish a MTSPR TBU40 instruction as a new operation.

When executing a MTSPR TBU40 instruction, the hardware only writes bits 0 to 39 into the TB register. The lower order bits, bits 40-63, of the TB value are not affected by the MTSPR, and maintain precise synchronization to the chip's TOD. The chip's TOD remains unchanged after this instruction is executed.

Because the sequence of reading the TB register, calculating the difference between the TBO of the old partition and the TBO of the new partition, and executing the MTSPR instruction can take several machine cycles, the TB value may have incremented between the time it was read and the new value was written to the high-order 40 bits. It is possible that the value of the low-order bits just happened to carry into the high-order bits before the high-order bits got written into the TB register. Thus, the carry over into the upper order bits was overwritten by the execution of the MTSPR TBU40 instruction. This could result in the appearance that the TB went backward, or result in different TB values on different physical processor cores.

Because bit 39 in the TBR only changes roughly every 32 milliseconds, this can be easily avoided by checking the TB value that was initially read for being within a bounded number of increments from carrying into bit 39. For example, if bits 40:53 were all ones, it would mean that the increment value would carry into bit 39 within the next 2 microseconds (since bit 53 corresponds to 2 us). If any of bits 40:53 were zero, it would mean that the hypervisor has at least 2 microseconds to complete the sequence before a carry into bit 39. If the value read does not allow enough time to guarantee that the sequence would complete before a carry into bit 39, the hypervisor could wait in a loop, reading the TB, until after the carry into bit 39 is observed, in which case the entire 32 millisecond window is available.

Such bounding mechanisms can incur significant stalls waiting for the carry into bit 39. To avoid these stalls, the preferred embodiment checks for the carry into bit 39 and corrects the value if it occurred. This is done by reading the TB value again after the update and comparing the low-order bits to the original value and incrementing the value again at bit 39 if the new TB register value is less than the original TB register value.

Machine checks are high priority interrupts that must be immediately handled by the hypervisor. In some cases, the instruction address to return to after the interrupt may be lost. It is possible that the hypervisor was in the process of suspending or resuming and cannot precisely return to the instruction that got interrupted, so it loses track of which partition's TBO is currently applied to the upper bits of the TB. In the event of a machine check, the value of the TB is restored from the chip's TOD, and the TBO for the next logical partition to be executed by the processor core is added to the upper order bits of the TBR. The value is checked to see if the low order bits of the TB carried into bit 39 while the TBO was being applied, and if so the TB is again incremented at bit 39.

Once the TBO is applied to the TB, the TB represents the relative time for the partition, while the chip TOD represents the relative time for the machine.

When a logical partition is migrated from a processor core in a first machine to a different processor core in a second machine, both machines must support virtualization and have a hypervisor firmware layer which supports partition migration, have the same fixed TB increment rate, and be connected by a network where data can be transmitted from either hypervisor to the other. Because the operating system in a partition may need to be aware of the migration to a different machine, a partition which is already suspended cannot be migrated directly. The hypervisor dispatches the partition if it is not already running to a processor core in that hypervisor's machine, notifies the operating system of the logical partition to be migrated to prepare for the migration, and suspends the partition from executing on the processor core with the intent to migrate it to a different machine.

The hypervisor in the first machine packages all the partition configuration data that is required to resume processing the logical partition on a different machine, which includes the partition's RTO value. It also includes the TB value from the last processor in the sending machine to suspend processing of the partition. Note that the TB value includes the TBO for the partition at this point. This configuration data is sent to the second machine over a network. The hypervisor on each machine defines a service partition to perform the work of packaging, sending, and receiving the data.

Earlier examples for determining the TBO were simplified for purpose of illustration, assuming that moving a partition from one machine to another was instantaneous. In reality, transmitting data over a network takes a measurable amount of time, and this elapsed time should be accounted for when calculating a new TBO.

In order to account for the elapsed time to transmit the partition data over the network when calculating the new TBO value on the second (receiving) machine, the service partitions on both machines use the same wall-clock time, e.g. Greenwich Mean Time (GMT). The 32 Mhz step signals which maintain time in each machine are typically only accurate to +/−20 ppm (parts per million), meaning the wall-clock time for the service partitions in the two machines may slowly drift apart over time. The hypervisors running in the service partitions on the two machines periodically synchronize to each other with messages over the network to correct any long term drift.

The service partitions only run on their own machines, so their TBO values are always zero. Therefore the TB value on a processor running a service partition is always the same as the chip's TOD value which represents the relative time for the machine. The hypervisor on the first (sending) machine includes the TB value and partition time (TB increment period*TB value+RTO) from the service partition with the data sent to the second (receiving) machine for the migrating partition.

When the hypervisor in the second machine receives the data for the migrating partition data, it determines the amount of time elapsed while transmitting the data by subtracting the service partition wall-clock time from the first (sending) machine from its own service partition wall-clock time.

The hypervisor in the second (receiving) machine must also calculate the new TBO for the migrating partition. The elapsed time for transmission of the data is converted to units of the TB by multiplying the constant TB increment rate by the elapsed wall-clock time. The new TBO value is then the TB from the migrating partition plus the elapsed time for the transmission of the data converted to units of the TB minus the TB of the service partition of the second (receiving) machine.

The new TBO value is stored with the migrated partition data in the hypervisor memory of the second (receiving) machine. The hypervisor in the second machine can then dispatch the logical partition to a particular processor core in the second machine, applying the TBO as described earlier.

FIG. 1 is a representative microprocessor or chip that may perform the functions of receiving and dispatching timing signals and occasionally recovering when one or more inbound oscillator signals becomes faulty. Chip 100 includes a first processor core 101a and second processor core 101b. Each processor core may be simply referred to as a core. A processor core may have multithreading capability, error detection and recovery functions, numerous general purpose registers (GPR) and special purpose registers (SPR).

Connectivity of first core 101a and second core 101b is preferably with level 2 cache 103 or L2, and the non-cacheable unit 105 or NCU. NCU 105 processes commands to store data received from a core via fabric bus 110 for storage to main memory. Such stores may be memory-mapped I/O. Access to memory that may be susceptible to frequent accesses later may be stored to the L2 103 in order to reduce latency of operations performed by a core.

L2 cache 103 may similarly provide access to its contents via fabric bus 110 which may interconnect to other chips on the same board, and also beyond the board upon which chip 100 is placed.

A nearby, but off-chip level 3 cache or L3 may be provided. Controls governing access between the cores and the L3 are in L3 cache control 113. Similarly, memory controller 115, and I/O interface 117 may be provided on-chip to facilitate long-latency access to general RAM and to various peripheral devices, respectively.

Symmetric multi-processor (SMP) fabric controls 119, is a special purpose device that mediates the contention for the fabric bus by the various attached devices, and provides for SMP topology configuration via expansion ports A, B, X, Y and Z. Five expansion ports are shown in the embodiment, however, it is understood that to achieve varying levels of complex multichip topologies, fewer or more expansion ports may be used. It is anticipated that five ports may provide 64 chips with rapid instruction, data, and timing signals between and among them.

Pervasive controls 121 are circuits that exist both outside and mingled within the various processing blocks found on chip. Among the functions of pervasive controls is the providing of back-ups to the processor state on each core by providing redundant copies of various GPRs and SPRs of each core at convenient instruction boundaries of each core processor. In addition, pervasive controls may assist in the detection of errors and communication of such errors to an outside service processor for further action by, e.g. firmware.

Pervasive controls 121 are a gating point for redundant oscillators and other circuits which provide or receive derivative timing signals. It is appreciated that a fault, or other condition may remove one or more redundant oscillators from the configuration, and it is an object of the pervasive control to select the better timing signal (or at least one that is within tolerances) from among the redundant oscillators, and step-encoded signals that may arrive via the expansion ports.

Each processor core includes its own time base register (TBR). For example, processor core 101a includes time base register 101aa and processor core 101b includes time base register 101bb. When the machine that includes a particular chip is restarted, each time base register in each processor core that is included in that chip is synchronized to the time of day (TOD) register that is included in that chip. For example, when the machine that includes chip 100 is restarted, a value will be written into the time of day registers that are included in each chip in the system. Thus, a value will be written into TOD 130. Thereafter, TB registers 101aa and 101bb are synchronized to TOD 130 by writing the value that is in TOD 130 into each TB register 101*aa* and 101*bb* at a known unit of time boundary, after which they remain synchronized by incrementing according to a common step signal.

A 32 MHz step signal 132 is received within chip 100 by TOD 130, TB register MTSPR TBU40 instruction 101*aa* and TB register 101*bb*.

Figure 2:
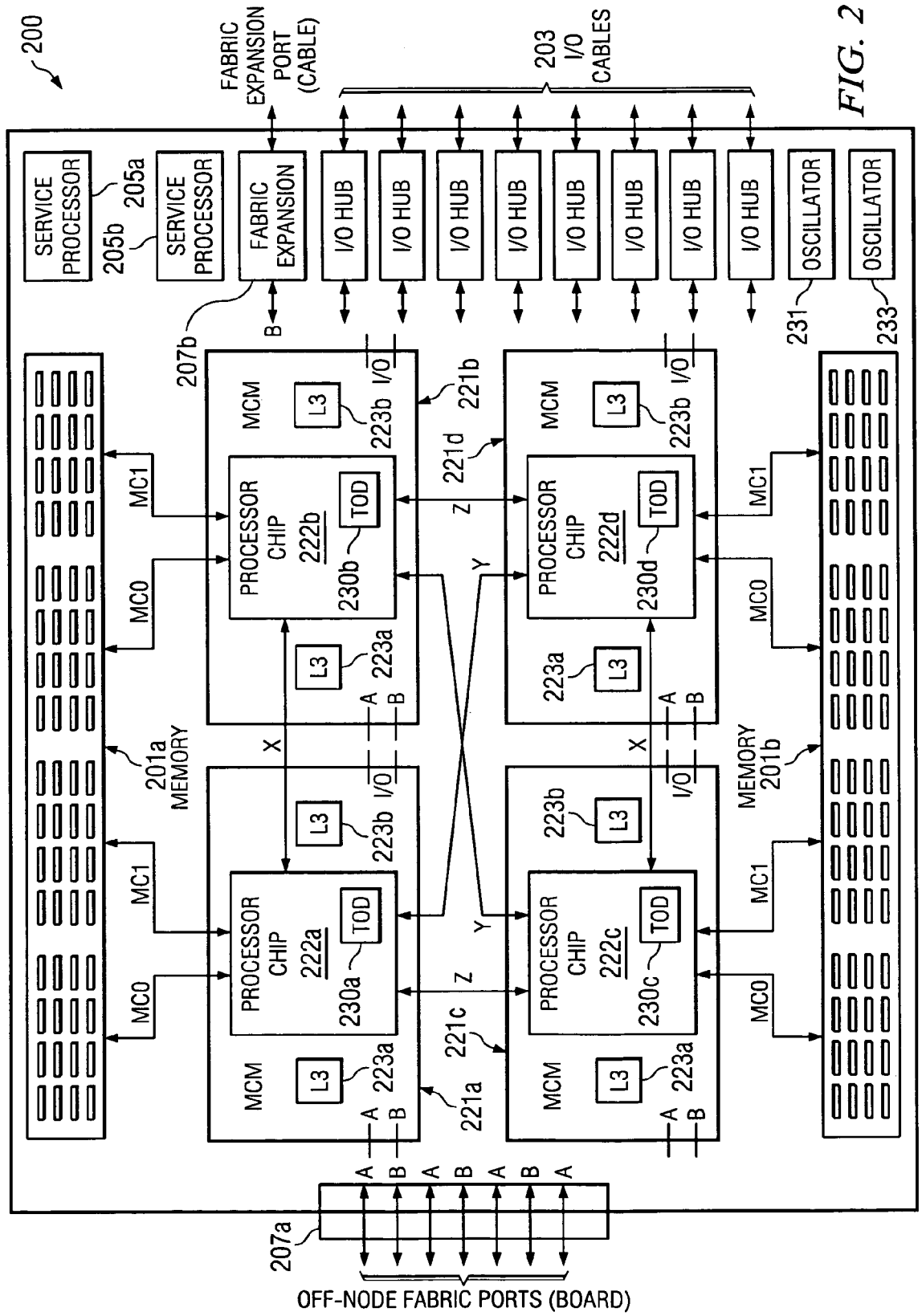
FIG. 2 illustrates a physical configuration of the multi-processor chips, such as the chip of FIG. 1, in a symmetric multi-processor (SMP) arrangement on a circuit board that is included within one computer system machine in accordance with the preferred embodiment of the present invention.

FIG. 2 illustrates a physical configuration of the multi-processor chips, such as the chip of FIG. 1, in a symmetric multi-processor (SMP) arrangement on a circuit board that is included within one computer system machine in accordance with the preferred embodiment of the present invention. Processor node 200 may contain memory banks 201*a* and 201*b*, I/O hubs 203, service processors 205*a* and 205*b*, and ports or connectors 207*a* and 207*b* handling the A and B SMP fabric expansion ports from each of multichip modules (MCM) 221*a*, 221*b*, 221*c*, and 221*d*. SMP fabric expansion ports X, Y, Z interconnect MCMs 221 within node 200, while ports A, B interconnect MCMs across multiple different nodes. Each multichip module may be identical in its hardware configuration, but configured by software to have varying topologies and functions as, e.g. between master and slave functions. Within an MCM may be found chips 222*a-d* of FIG. 2, as well as level 3 cache memory 223*a* and 223*b*. Processor node 200 may have primary oscillator 231 and secondary oscillator 233 that are each routed to each chip found on the processor node. Connections between the oscillators and functional units extend throughout the board and chips, but are not shown in FIG. 2 in order to limit clutter. Similarly, it is understood that many convoluted interconnects exist between the ports and I/O hubs, among other components, although such interconnects are not shown here.

Each MCM includes a chip. For example, MCM 221*a* includes chip 222*a*. MCM 221*b* includes chip 222*b*. MCM 221*c* includes chip 222*c*. MCM 221*d* includes chip 222*d*.

Each chip includes its own time of day (TOD) register. For example, chip 222*a* includes TOD 230*a*. Chip 222*b* includes TOD 230*b*. Chip 222*c* includes TOD 230*c*. Chip 222*d* includes TOD 230*d*.

The TOD registers in all of the chips in a machine are initially synchronized together. Synchronization is maintained by stepping the TOD register values to a 32 MHz pulse that is distributed throughout the machine. In addition to the 32 MHz pulse, a synchronization pulse is sent on every 2 microsecond boundary. In the preferred embodiment, the 32 MHz pulse corrects to bit 59 of the 64-bit value and the 2 microsecond boundary occurs when bits 54 through 63 are all zeros.

Figure 3:
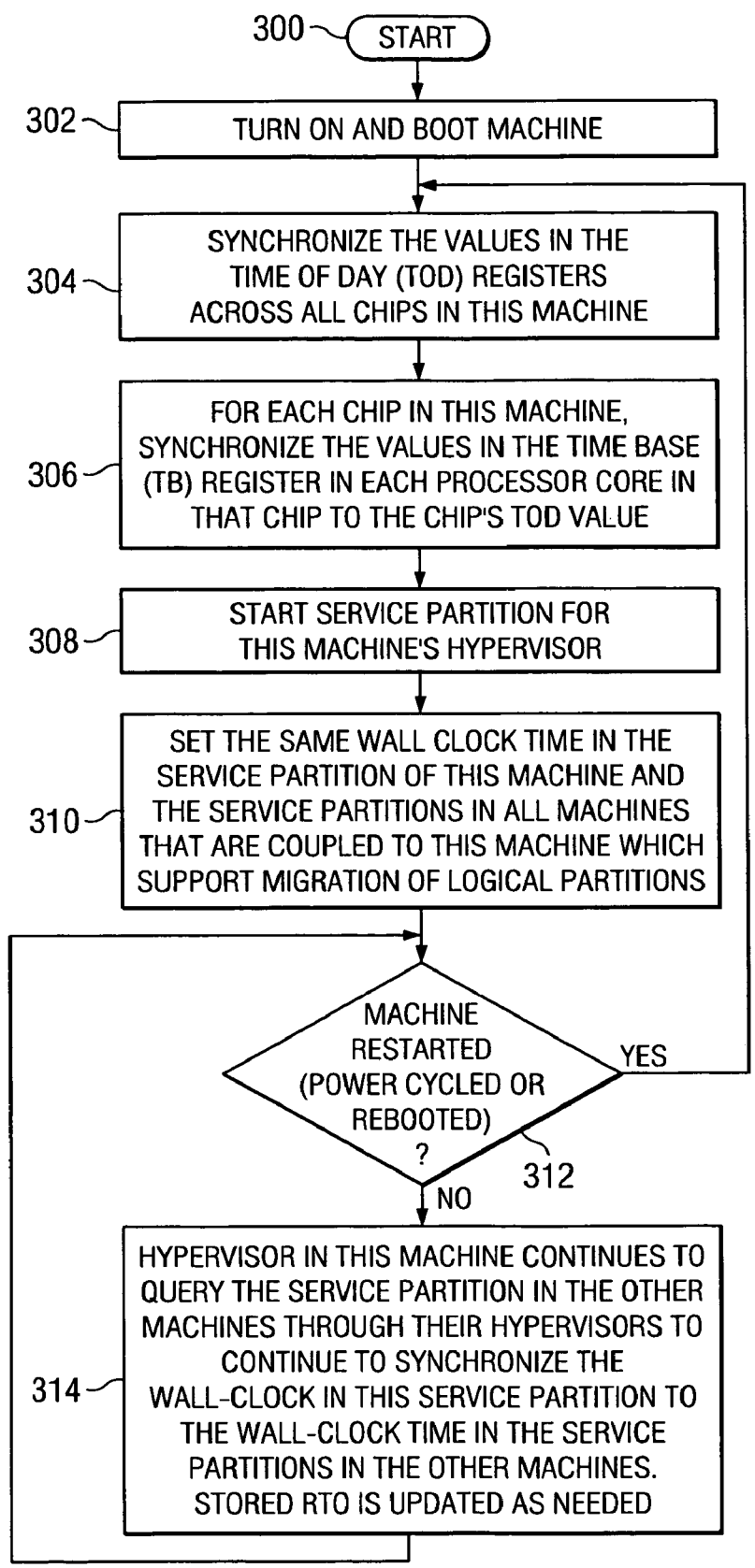
FIG. 3 depicts a high level flow chart that illustrates synchronizing each chip within a machine to the other chips in that machine, synchronizing each processor core's TB to the TB in every other processor core in that chip, and synchronizing multiple separate machines to each other in accordance with the present invention.

FIG. 3 depicts a high level flow chart that illustrates synchronizing each chip within a machine to the other chips in that machine, synchronizing each processor core's TB within each chip to the TB in every other processor core in that chip, and synchronizing multiple separate machines to each other in accordance with the present invention. The process starts as depicted by block 300 and thereafter passes to block 302 which illustrates turning on and booting a machine, e.g. executing a Power-on-Reset in the machine. The machine boot includes loading and starting the hypervisor firmware.

Next, block 304 depicts synchronizing the values in the time of day (TOD) registers across all chips. In a preferred method, this synchronization involves writing an initial value (normally zero) to one chip TOD, then invoking a hardware state machine, e.g. by writing to the TMFR, which propagates the value throughout the machine to all other chips, enables incrementing of the TODs on all chips at the same time according to a sync signal at every 2 microsecond boundary, and maintaining synchronization using a 32 Mhz step signal which corresponds to bit (59) of the TOD value.

Next, block 306 depicts for each chip in this machine, synchronizing the values in the time base register (TB) in each processor core in that chip to the chip TOD value. In the preferred method, this is done by the hypervisor writing to a Timing Facilities Management Register (TMFR) in each processor core using a MTSPR instruction, which causes the chip's TOD value to be transferred to the TB register at the next 2 microsecond sync boundary, which then maintains synchronization by stepping the TB register to the same 32 Mhz step pulse as the chip TOD is stepped to. Next, block 308 depicts starting a service partition for this machine's hypervisor.

The process then passes to block 310 which illustrates setting the same wall-clock time (e.g. GMT) in the service partitions for this machine and all machines that are coupled to this machine which support migration of logical partitions. The hypervisor on each machine stores the real-time offset (RTO) for the service partition in its memory. The RTO is determined from the specified wall-clock time minus the TB value multiplied by the TB increment period. The determination of which machines are available for partition migration is made by the network administrator and system operators.

The process then passes to block 312 which depicts a determination of whether or not the machine has been restarted such as by cycling the machine's power off/on or by rebooting the machine. If a determination is made that the machine has been restarted, the process passes back to block 304. Referring again to block 312, if a determination is made that the machine has not been restarted, the process passes to block 314 which illustrates the hypervisor in this machine continuing to query the service partition in the other machines through their hypervisors in order to continue to synchronize the time in this service partition to the time in the service partitions in the other machines. The process then loops back to block 312.

Figure 4:
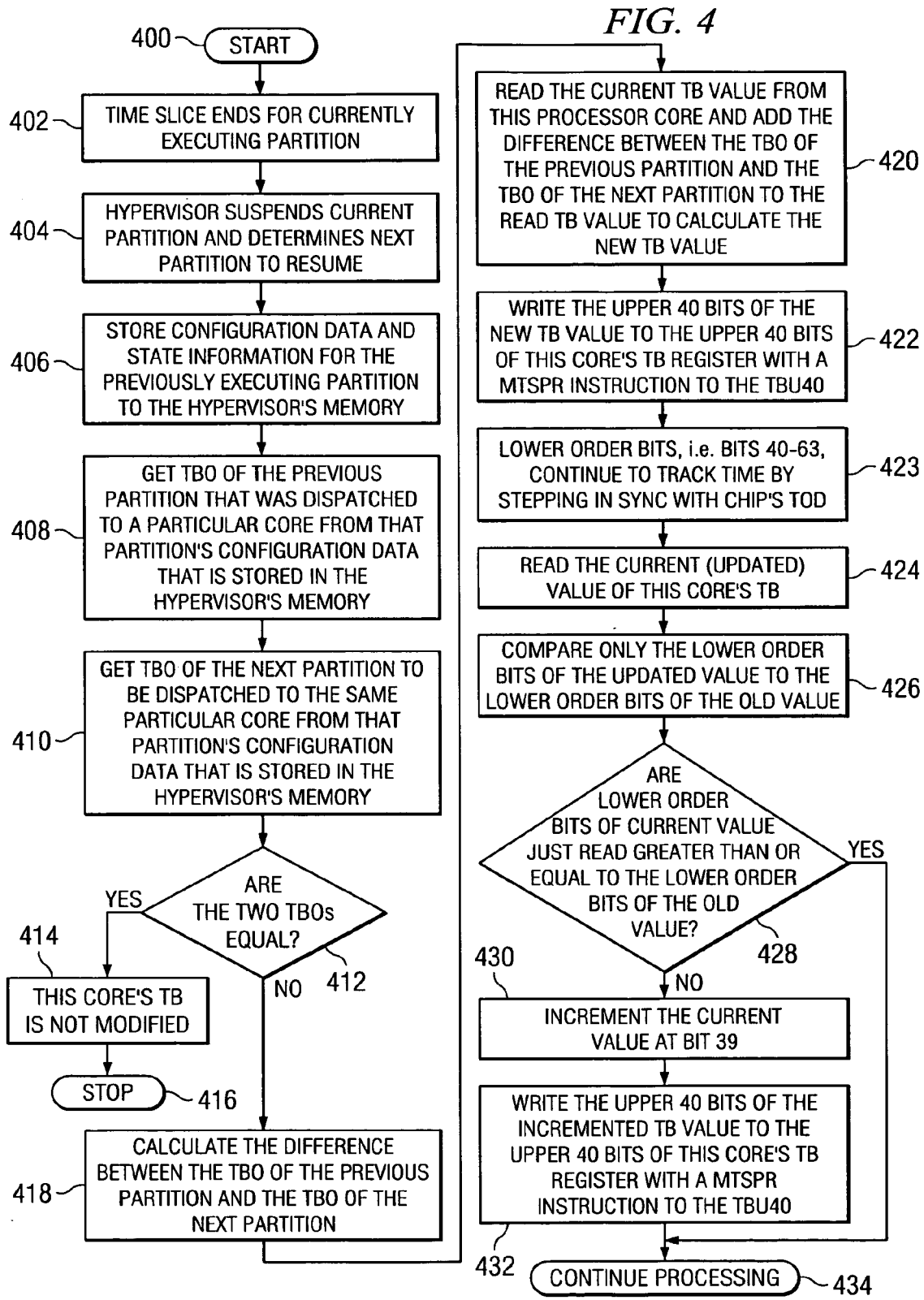
FIG. 4 illustrates a high level flow chart that depicts a process that is executed by a particular machine's hypervisor to adjust the TB value in a processor core to the relative time that is associated with a particular partition which is resumed on the processor during normal partition processing in accordance with the present invention.

FIG. 4 illustrates a high level flow chart that depicts a process that is executed by a particular machine's hypervisor to adjust the value of the TB register in a processor core to the relative time that is associated with a particular partition which is resumed on the processor during normal partition processing in accordance with the present invention. The process starts as depicted by block 400 and thereafter passes to block 402 which illustrates the time slice ending for the logical partition currently executing on a particular processor core. Next, block 404 depicts the hypervisor suspending the partition currently executing on a particular processor core and determining which partition to resume on that processor core. Block 406, then, illustrates storing all configuration data and state information, which is required to later resume processing of the partition, for the partition previously executing on the particular processor core to the hypervisor's memory.

The process then passes to block 408 which depicts the hypervisor getting the TBO of the previous partition that was dispatched to a particular core from that partition's configuration data that is stored in the hypervisor's memory. Next, block 410 illustrates the hypervisor getting the TBO of the next partition that is to be dispatched to the particular core from that partition's configuration data that is stored in the hypervisor's memory.

Thereafter, block 412 depicts a determination of whether or not these two TBOs are equal. If a determination is made that the two TBOs are the same, the process passes to block 414 which illustrates this particular processor core's TB register value not being modified. The process then terminates as depicted by block 416.

Referring again to block 412, if a determination is made that the two TBOs are different, the process passes to block 418 which depicts calculating the difference between the TBO of the previously dispatched partition and the TBO of the next partition to be dispatched to this processor core. Thereafter, block 420 illustrates reading the current TB register value from this processor core and subtracting the difference between the TBO of the previous partition and the TBO of the next partition from the TB register value that was read from the core to calculate the new TB register value.

Next, block 422 depicts writing the upper 40 bits of the new TB value to the upper 40 bits of this core's TB register by executing a MTSPR instruction to the TBU40. The process then passes to block 423 which illustrates the lower order bits, i.e. bits 40-63 continuing to count time by continuing stepping in sync with the chip's TOD.

Block 424, then, illustrates reading the current (updated) value of this core's TB register. Thereafter, block 426 depicts comparing only the lower order bits of the updated value to the lower order bits of the old value that was read as depicted in block 420.

Thereafter, block 428 illustrates a determination of whether or not the lower order bits of the current (updated) value just read is greater than or equal to the lower order bits of the old value. If a determination is made that the lower order bits of the current value just read is greater than or equal to the lower order bits of the old value, the process is complete and processing continues as indicated by block 434. Referring again to block 428, if a determination is made that the lower order bits of the current value just read is not greater than or equal to the lower order bits of the old value, the process passes to block 430 which depicts the incrementing of the current TB value just read by incrementing bit 39. The failed comparison in block 428 indicates that the TB register value had incremented and carried into bit 39 between the time it was first read and when the modified value was written back to the upper 40 bits. Incrementing the value at bit 39 adjusts for the increment that was lost by being overwritten.

Next, block 432 depicts writing the upper 40 bits of the incremented TB value to the upper 40 bits of this core's TB register with a MTSPR instruction to the TBU40. The process is then complete and processing continues as depicted by block 434.

FIG. 5 depicts a high level flow chart that illustrates a process that is executed by a particular machine's hypervisor to adjust the TB value in a processor core to the relative time that is associated with a particular partition which is resumed on the processor after the occurrence of a machine check in accordance with the present invention. The process starts as depicted by block 500 and thereafter passes to block 502 which illustrates a machine check occurring in the machine. When a machine check occurs, the values in each chip's TOD are not affected. Thus, the TOD values remain valid.

The process then passes to block 504 which depicts the hypervisor restoring the TB value in a particular processor core from the chip TOD by writing to the Timing Facilities Management Register (TFMR) in that processor core. This causes the hardware to wait for the next 2 microsecond boundary, then transfer the value from the chip TOD to the core TB and resume synchronous stepping.

Block 506, then, illustrates getting the time base offset (TBO) of the next partition to be dispatched to a particular core from that partition's configuration data that is stored in the hypervisor's memory. Next, block 507 depicts reading the current TB value from this TB register in this processor core and adding the TBO of the next partition to the TB value just read in order to calculate the new TB value. Then, block 508 depicts writing the upper 40 bits of the new TB value to the upper 40 bits of this core's TB register with a MTSPR instruction to the TBU40.

Next, block 510, illustrates reading the current updated) value of this core's TB from the core's TB register. Block 512, then, depicts comparing only the lower order bits of the updated value to the lower order bits of the old value.

The process then passes to block 514 which illustrates a determination of whether or not the lower order bits of the current (updated) value just read is greater than or equal to the lower order bits of the old value. If a determination is made that the lower order bits of the current (updated) value just read is not greater than or equal to the lower order bits of the old value, the process passes to block 518 which depicts incrementing the current TB value just read by incrementing bit 39. The failed comparison in block 514 indicates that the TB incremented and carried into bit 39 between the time it was first read and when the modified value was written back to the upper 40 bits of the TB register. Incrementing the value at bit 39 adjusts for the increment that was lost by being overwritten.

Next, block 520 illustrates writing the upper 40 bits of the incremented TB value to the upper 40 bits of this core's TB register with a MTSPR instruction to the TBU40. The process then passes to block 516 and processing continues.

Referring again to block 514, if a determination is made that the lower order bits of the current (updated) value just read is greater than or equal to the lower order bits of the old value, the process passes to block 514 which depicts continuing processing.

Figure 6:
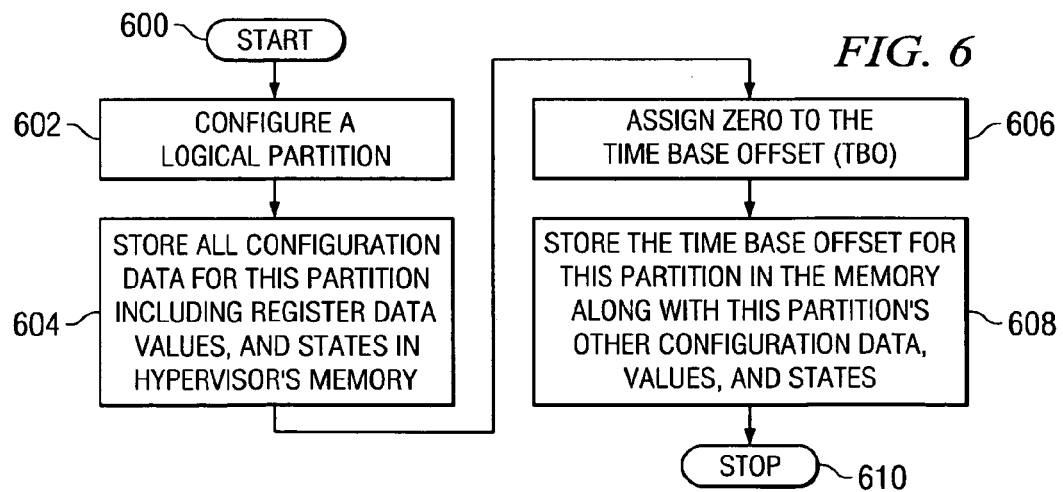
FIG. 6 illustrates a high level flow chart that depicts creating a logical partition, assigning an initial time base offset (TBO) of zero for that partition, and storing the TBO in the configuration data for that partition in accordance with the present invention.

FIG. 6 illustrates a high level flow chart that depicts creating a logical partition, assigning an initial time base offset (TBO) of zero for that partition, and storing the TBO in the configuration data for that partition in accordance with the present invention. The process depicted by FIG. 6 is executed by a hypervisor. The process starts as depicted by block 600 and thereafter passes to block 602 which illustrates configuring a logical partition. Next, block 604 depicts storing all configuration data for this partition, including register data, values, and states in the hypervisor's memory.

The process then passes to block 606 which illustrates assigning an initial TBO of zero for the partition. When the hypervisor creates a new logical partition, the TBO value is initially zero. As long as the logical partition is only dispatched on the same machine where it was created, the TBO will remain zero. Next, block 608 depicts storing, in the memory, the time base offset for this partition along with this partition's other configuration data, values, and states. The process then terminates as illustrated by block 610.

Figure 7A:
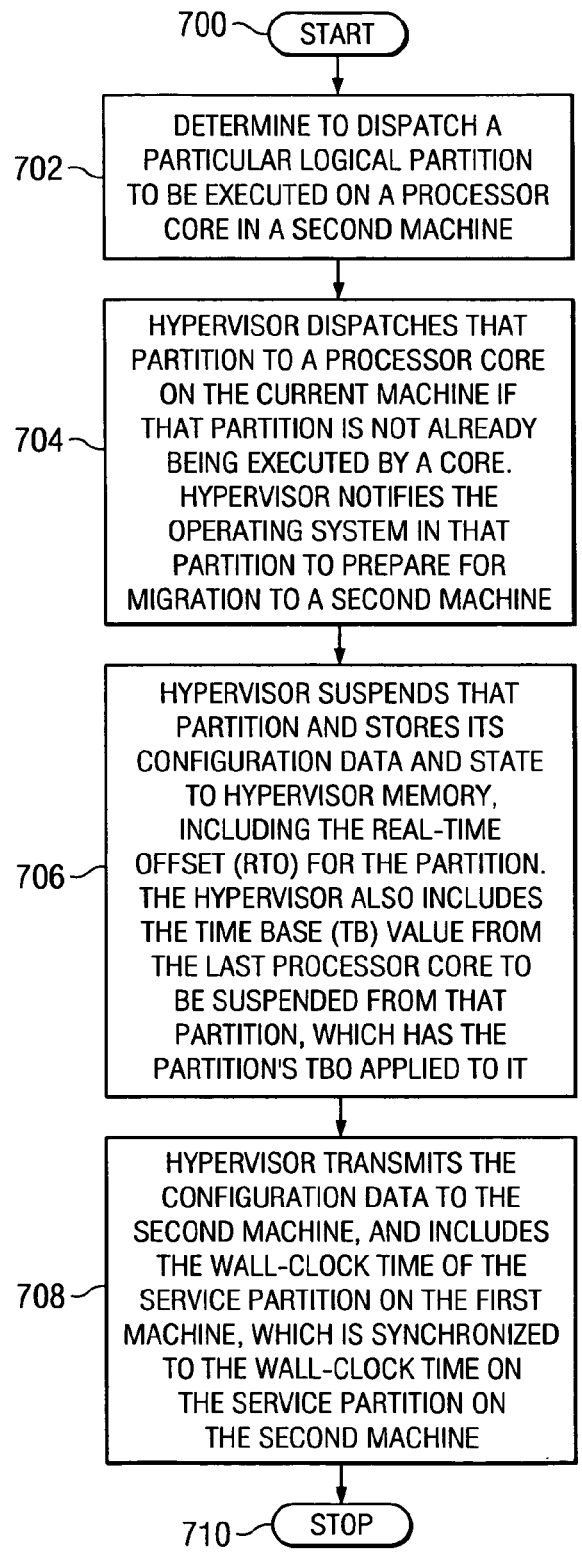
FIG. 7A depicts a hypervisor in a first machine transmitting a logical partition to a second machine for execution by a processor core in the second machine in accordance with the present invention.

FIG. 7A depicts a hypervisor in a first computer system machine transmitting a logical partition to a second computer system machine for execution by a processor core in the second computer system machine in accordance with the present invention. The process starts as depicted by block 700 and thereafter passes to block 702 which illustrates determining by the hypervisor in the first machine to dispatch a particular logical partition to be executed on a processor core in a second machine.

Next, block 704 depicts the hypervisor dispatching the particular partition to a processor core on the current machine if the partition is not already being executed by a core. The hypervisor notifies the operating system for that partition to prepare for migration to a second machine. Then, block 706 depicts the hypervisor suspending that partition from executing on the core, and storing its configuration data and state to hypervisor memory, including the real-time offset (RTO) for the partition. The hypervisor also includes the time base (TB)

value from the last processor core that was executing the partition. This is the core that was last to suspended that partition. This TB value has the partition's TBO applied to it.

Block 708, then, illustrates the hypervisor in the first machine transmitting the configuration data to the second machine. The hypervisor also sends the wall-clock time of the service partition on the first machine, which is synchronized to the wall-clock time on the service partition on the second machine. The process then terminates as depicted by block 710.

Figure 7B:
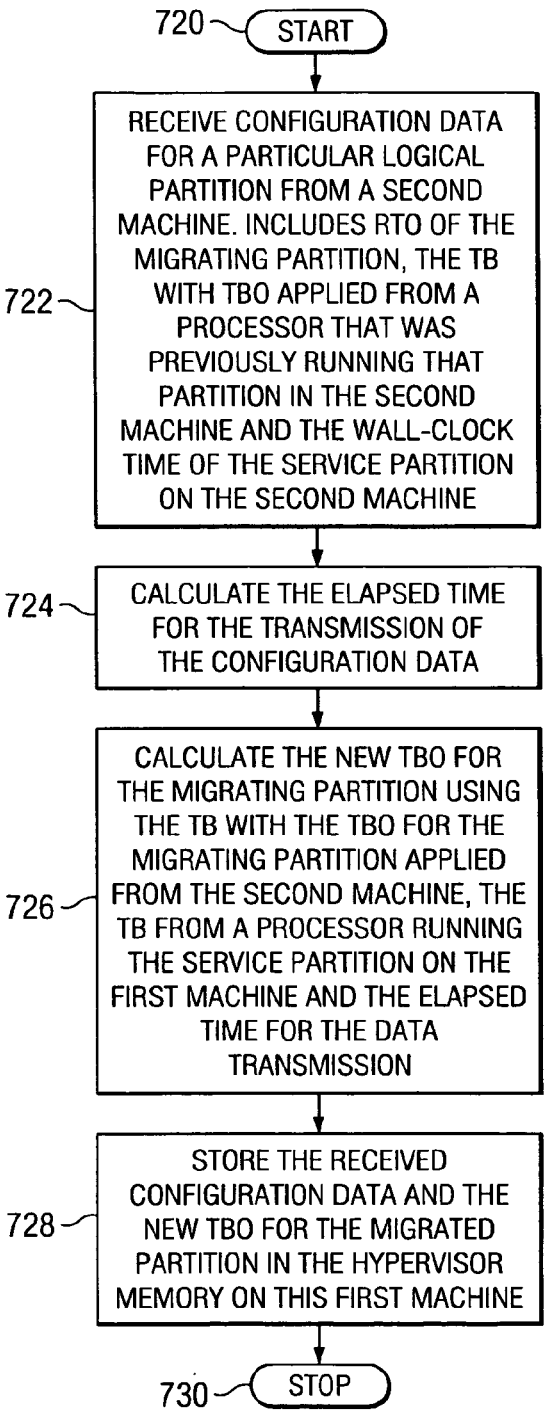
FIG. 7B illustrates a hypervisor in a first machine receiving a logical partition from a second machine for execution by a processor core in the first machine in accordance with the present invention.

FIG. 7B illustrates a hypervisor in a first computer system machine receiving a logical partition from a second computer system machine for execution by a processor core in the first computer system machine in accordance with the present invention. The process starts as depicted by block 720 and thereafter passes to block 722 which illustrates receiving, by the first machine, configuration data for a particular logical partition from a second machine, including the RTO of the migrating partition, the TB value with TBO applied from a processor core that was previously running that partition in the second machine, and the wall-clock time of the service partition on the second machine. Thereafter, block 724 depicts calculating the elapsed time for the transmission of the configuration data.

Next, block 726 depicts calculating the new TBO for the migrating partition using the TB with the TBO for the migrating partition applied from the second machine, the TB from a processor running the service partition on the first machine, and the elapsed time for the data transmission. The elapsed time for transmission of the data is converted to units of the TB by multiplying the constant TB increment rate by the elapsed wall-clock time. The new TBO value is then the TB from the migrating partition plus the elapsed time for the transmission of the data converted to units of the TB minus the TB of the service partition of the first (receiving) machine.

Next, block 728 depicts storing, in memory in the hypervisor in the first machine, the received configuration data and the new TBO for the migrated logical partition. The process then terminates as depicted by block 730.

Figure 8:
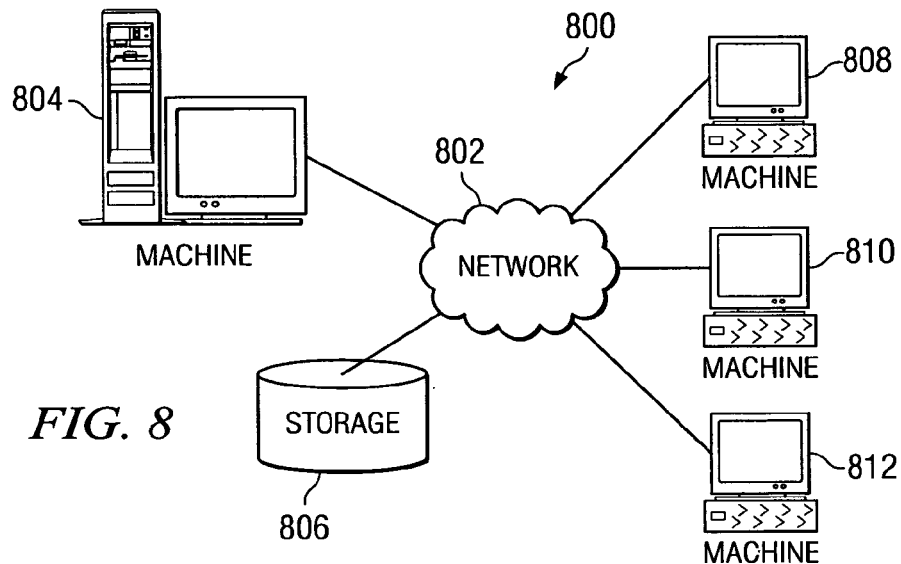
FIG. 8 is a pictorial representation of a network of machines that includes the present invention in accordance with the present invention.

FIG. 8 is a pictorial representation of a network of computer system machines that includes the present invention in accordance with the present invention. Network data processing system 800 is a network of computer system machines in which the present invention may be implemented. Network data processing system 800 contains a network 802, which is the medium used to provide communications links between various devices and computers connected together within network data processing system 800. Network 802 may include connections, such as wire, wireless communication links, or fiber optic cables.

In the depicted example, a machine 804, such as a server, is connected to network 802 along with storage unit 806. In addition, other machines 808, 810, and 812 also are connected to network 802. These machines 808, 810, and 812 may be clients. Machines 808, 810, and 812 may be, for example, personal computers, network computers, or other computing devices. In the depicted example, server 804 provides data, such as boot files, operating system images, and applications to clients 808-812. Clients 808, 810, and 812 are clients to server 804. Network data processing system 800 may include additional servers, clients, and other devices not shown. In the depicted example, network data processing system 800 is the Internet with network 802 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 800 also may be implemented as a number of different types of networks, such as for example, an intranet, a local area network (LAN), a wide area network (WAN), or a wireless network. FIG. 8 is intended as an example, and not as an architectural limitation for the present invention.

Figure 9:
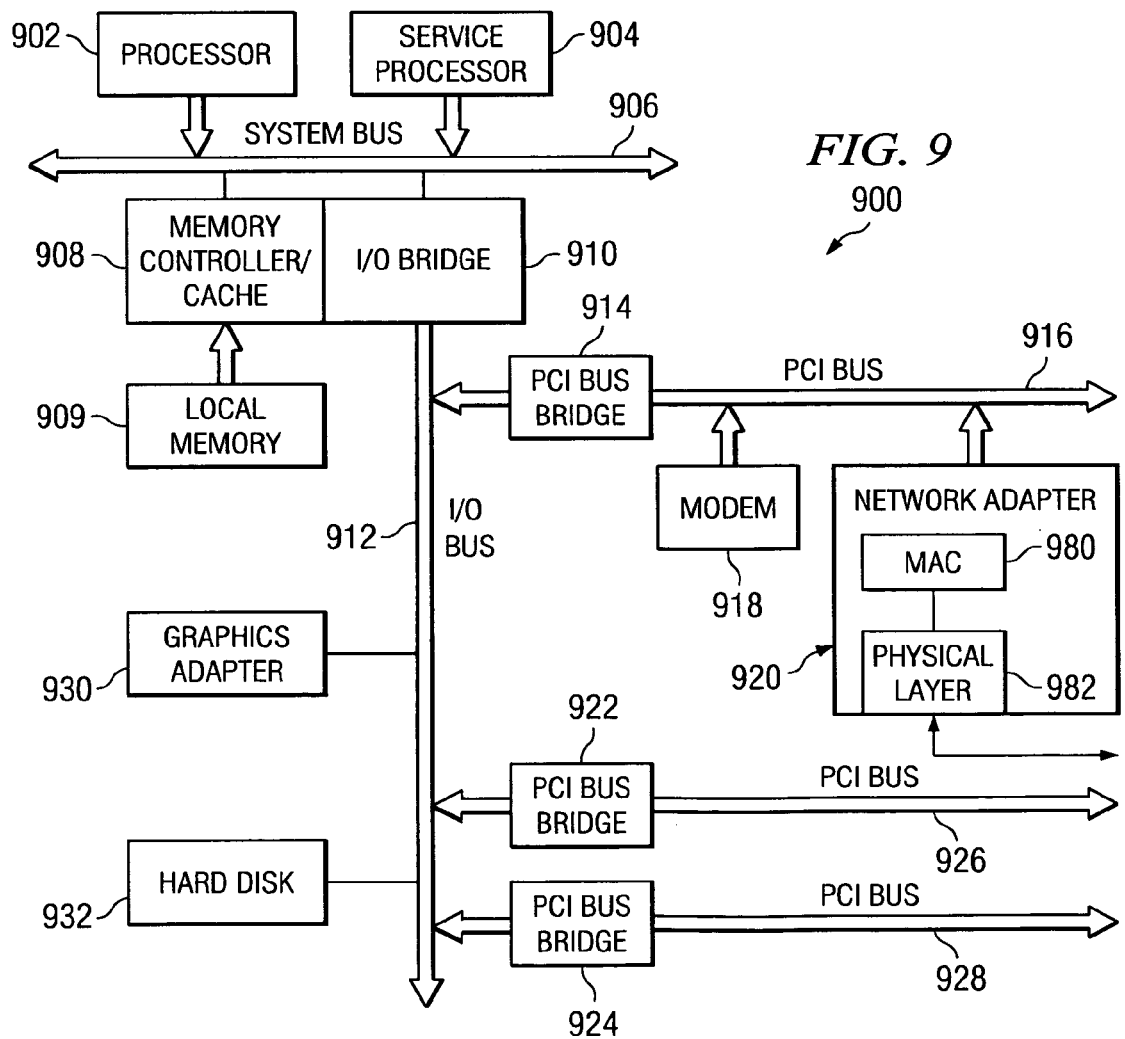
FIG. 9 is an illustration of a computer system machine which includes a processor in accordance with the present invention.

FIG. 9 is an illustration of a computer system machine which includes a processor in accordance with the present invention. Data processing system 900 may be a symmetric multiprocessor (SMP) system including a plurality of processors 902 and 904 connected to system bus 906. Alternatively, a single processor system may be employed. One processor may be a service processor, e.g. service processor 904. Also connected to system bus 906 is memory controller/cache 908, which provides an interface to local memory 909. I/O Bus Bridge 910 is connected to system bus 906 and provides an interface to I/O bus 912. Memory controller/cache 908 and I/O Bus Bridge 910 may be integrated as depicted.

Peripheral component interconnect (PCI) bus bridge 914 connected to I/O bus 912 provides an interface to PCI local bus 916. A number of modems may be connected to PCI bus 916. Typical PCI bus implementations will support four PCI expansion slots or add-in connectors. Communications links to other computers may be provided through modem 918 and network adapter 920 connected to PCI local bus 916 through add-in boards.

Network adapter 920 includes a physical layer 982 which conditions analog signals to go out to the network, such as for example an Ethernet network over an R45 connector. A media access controller (MAC) 980 is included within network adapter 920. Media access controller (MAC) 980 is coupled to bus 916 and processes digital network signals. MAC 980 serves as an interface between bus 916 and physical layer 982.

Additional PCI bus bridges 922 and 924 provide interfaces for additional PCI buses 926 and 928, from which additional modems or network adapters may be supported. In this manner, data processing system 900 allows connections to multiple network computers. A memory-mapped graphics adapter 930 and hard disk 932 may also be connected to I/O bus 912 as depicted, either directly or indirectly.

Those of ordinary skill in the art will appreciate that the hardware depicted in FIG. 9 may vary. For example, other peripheral devices, such as optical disk drives and the like, also may be used in addition to or in place of the hardware depicted. The depicted example is not meant to imply architectural limitations with respect to the present invention.

Figure 10:
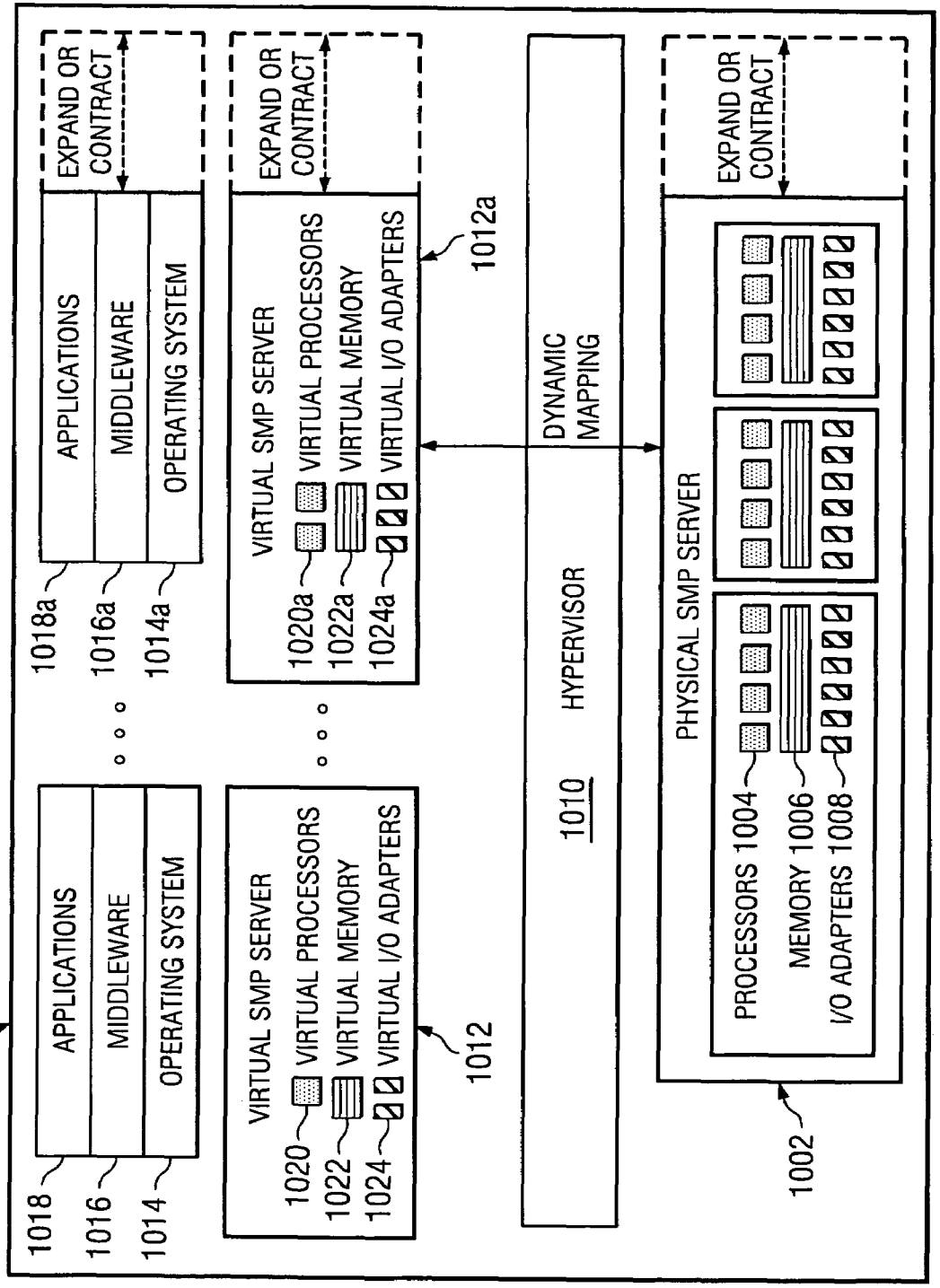
FIG. 10 is a block diagram of a computer system machine, including a hypervisor, in which the present invention may be implemented.

FIG. 10 is a block diagram of a computer system machine, including a hypervisor, in which the present invention may be implemented. System 1000 is preferably a symmetric multi-processing (SMP) server computer system. SMP server computer system 1000 includes physical hardware devices that can be mapped to, i.e. temporarily owned by, a user application to execute that application.

SMP server computer system 1000 includes a physical SMP server 1002. Physical SMP server 1002 includes physical hardware devices such as processors 1004, memory 1006, and I/O adapters 1008. These physical devices are managed by hypervisor 1010. Each one of the processors 1004 is preferably a simultaneous multithreaded (SMT) processor that is capable of concurrently executing multiple different threads on the processor.

A virtual server is a proxy for a physical server that has the same capabilities, interfaces, and state. Virtual servers are created and managed by a hypervisor that resides on physical SMP server computer system 1000. A virtual server appears to be a physical SMP server to its user: the operating system, middleware, and application software that run upon it. SMP server computer system 1000 includes one or more virtual servers such as virtual server 1012 and virtual server 1012*a*.

Each virtual server appears to its software to include its own virtual processor(s), memory, and I/O adapter(s) that are available for the exclusive use of that virtual server. For example, virtual server 1012 includes a virtual processor 1020, virtual memory 1022, and virtual I/O adapters 1024. Virtual server 1012*a* includes virtual processors 1020*a*, virtual memory 1022*a*, and virtual I/O adapters 1024*a*.

Each virtual server supports its own software environment, including an operating system, middleware, and applications. The software environment of each virtual server can be different from the software environment of other virtual servers. For example, the operating systems executed by each virtual server may differ from one another.

For example, virtual server 1012 supports operating system 1014, middleware 1016, and applications 1018. Virtual server 1012*a* supports operating system 1014*a*, middleware 1016*a*, and applications 1018*a*. Operating systems 1014 and 1014*a* may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 1010 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 1004, is selected by hypervisor 1010 to be used to execute and implement that virtual processor. Hypervisor 1010 manages the selections of physical devices and their temporary assignment to virtual devices.

Hypervisor 1010 is responsible for dynamically creating, managing, and destroying virtual SMP servers. Whole virtual processors, virtual I/O adapters, and virtual memory blocks can be removed or added by hypervisor 1010. Hypervisor 1010 is also responsible for dynamic resource allocation, managing time-sharing of physical resources, and altering the physical resource mapped to a processor without involving the operating system. Hypervisor 1010 is responsible for dispatching a logical partition to one or more physical processor cores in system 1000. Hypervisor 1010 is also able to dedicate physical resources to virtual resources for situations where sharing is not desired. Hypervisor 1010 is responsible for managing the addition or removal of physical resources. Hypervisor 1010 makes these additions and deletions transparent to the upper level applications.

Figure 11:
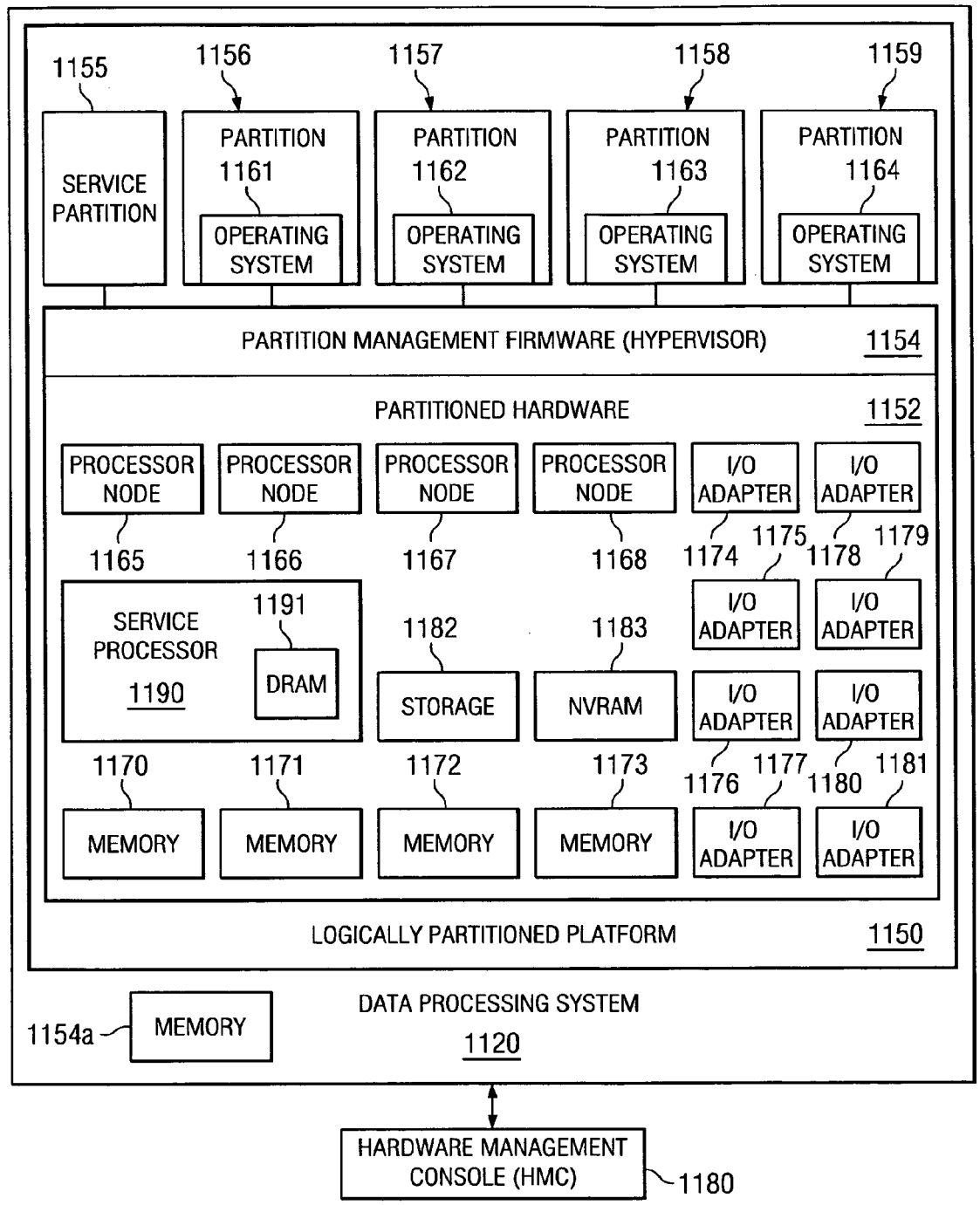
FIG. 11 is a block diagram of a logically partitioned platform that includes the present invention.

FIG. 11 is a block diagram of a logically partitioned platform that includes the present invention. Data processing system 1120 includes logically partitioned platform 1150. Platform 1150 includes partitioned hardware 1152, partition management firmware, also called a hypervisor 1154, and partitions 1156-1159.

Operating systems 1161-1164 exist within partitions 1156-1159. Operating systems 1161-1164 may be multiple copies of a single operating system or multiple heterogeneous operating systems simultaneously run on platform 1150.

A service partition 1155 is included within system 1120 and is dedicated for the exclusive use of hypervisor 1154.

Partitioned hardware 1152 includes a plurality of processor nodes 1165-1168, a plurality of system memory units 1170-1173, a plurality of input/output (I/O) adapters 1174-1181, and a storage unit 1182. Each of the processor cores included in processor nodes 1165-1168, memory units 1170-1173, NVRAM storage 1183, and I/O adapters 1174-1181 may be assigned to one of multiple partitions 1156-1159. Partitioned hardware 1152 also includes service processor 1190. A non-volatile memory device 1191, such as an NVRAM device, is included within service processor 1190.

Partition management firmware (hypervisor) 1154 performs a number of functions and services for partitions 1156-1159 to create and enforce the partitioning of logically partitioned platform 1150. Hypervisor 1154 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 1154 allows the simultaneous execution of independent OS images 1161-1164 by virtualizing all the hardware resources of logically partitioned platform 1150. Hypervisor 1154 may attach I/O devices through I/O adapters 1174-1181 to single virtual machines in an exclusive mode for use by one of OS images 1161-1164.

A memory 1154*a* is reserved for the exclusive use of hypervisor 1154.

A hardware management console (HMC) 1180 may be coupled to service processor 1190 in data processing system 1120. HMC 1180 is a separate computer system that is coupled to service processor 690 and may be used by a user to control various functions of system 1120 through service processor 1190.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing virtualized time base in a logically partitioned data processing system, said method comprising: determining a time base for each one of a plurality of processor cores, said time base being used to indicate a current time to each one of said plurality of processor cores for which said time base is determined; synchronizing said time bases together for said plurality of processor cores wherein each one of said plurality of processor cores includes its own copy of a synchronized time base; generating, for one of said plurality of processor cores, a virtualized time base that is different from said synchronized time base but that remains synchronized with at least a portion of said synchronized time base; utilizing, by said one of said plurality of processor cores, said virtualized time base instead of said synchronized time base for indicating said current time to said one of said plurality of processor cores; said virtualized time base and said portion of said synchronized time base remaining in synchronization together; executing one of a first plurality of logical partitions on a first one of said plurality of processor cores in a first machine, said first one of said plurality of processor cores utilizing said synchronized time base; suspending processing of said one of said first plurality of logical partitions on said first machine; transmitting said one of said first plurality of logical partitions to a second machine for processing on one of a second plurality of processor cores that are included within said second machine; determining a second time base for each one of said second plurality of processor cores; synchronizing said second time bases together for said second plurality of processor cores wherein each one of said second plurality of processor cores includes its own copy of a second synchronized time base; generating a second virtualized time base for said one of said second plurality of processor cores, said second virtualized time base being different from said second synchronized time base but remaining synchronized with at least a portion of said second synchronized time base; and executing said one of said first plurality of logical partitions utilizing said one of said second plurality of processor cores, said one of said second plurality of processor cores utilizing said second virtualized time base.

2. The method according to claim 1, further comprising:
said synchronized time bases for said plurality of processor cores and said virtualized time base being represented using a plurality of bits that include first bits and second bits; and
generating said virtualized time base by modifying said first bits of said time base while said second bits of said time base remain unaffected, said virtualized time base including said modified first bits and said second bits.

3. The method according to claim 2, further comprising:
executing a move-to-special-purpose-register instruction that modifies only said first bits and leaves said second bits unaffected; and
said instruction writing a new value into only said first bits.

4. The method according to claim 2, further comprising:
said second bits of said time base continuing to remain synchronized to said second bits of said synchronized time base after said first bits are modified.

5. The method according to claim 4, further comprising:
identifying a time base offset for said one of said plurality of logical partitions; and
modifying said first bits of said time base utilizing said time base offset.

6. The method according to claim 5, further comprising:
after modifying said first bits, determining whether a time being represented by said second bits had carried over into said first bits while said first bits were being modified; and
in response to determining that said time being represented by said second bits had carried over into said first bits while said first bits were being modified, updating said first bits to represent said carry over.

7. The method according to claim 1, further comprising:
creating said one of said first plurality of logical partitions on said first machine; and
generating, by said second machine, a time base offset for said one of said first plurality of logical partitions, said time base offset indicating a relative difference in time between said synchronized time base in said first machine and said second synchronized time base in said second machine.

8. The method according to claim 1, further comprising:
creating said one of said first plurality of logical partitions on said first machine;
prior to transmitting said one of said first plurality of logical partitions to said second machine, generating, by said first machine, a time base offset for said one of said first plurality of logical partitions, said time base offset being initially set equal to zero, said time base offset remaining static so long as said one of said first plurality of logical partitions is processed by said first machine and not transmitted to another machine;
modifying, by said second machine, said time base offset to indicate a relative difference in time between said synchronized time base in said first machine and said second synchronized time base in said second machine; and
said modified time base offset remaining static in said second machine so long as said one of said first plurality of logical partitions is processed by said second machine and is not transmitted to another machine.

9. A method for providing virtualized time base in a logically partitioned data processing system, said method comprising: determining a time base for each one of a plurality of processor cores, said time base being used to indicate a current time to each one of said plurality of processor cores for which said time base is determined; synchronizing said time bases together for said plurality of processor cores wherein each one of said plurality of processor cores includes its own copy of a synchronized time base; generating, for one of said plurality of processor cores, a virtualized time base that is different from said synchronized time base but that remains synchronized with at least a portion of said synchronized time base; utilizing, by said one of said plurality of processor cores, said virtualized time base instead of said synchronized time base for indicating said current time to said one of said plurality of processor cores; said virtualized time base and said portion of said synchronized time base remaining in synchronization together; creating a logical partition by a first machine that includes said plurality of processor cores that utilize said synchronized time bases; transmitting said logical partition to a second machine for execution by said second machine, said second machine utilizing a second synchronized time base; and determining a time base offset for said logical partition, said time base offset representing a difference between said first synchronized time base and said second synchronized time base.

10. The method according to claim 9, further comprising:
determining a second virtualized time base utilizing said time base offset; and
executing said logical partition by a processor core in said second machine, said processor core utilizing said second virtualized time instead of said second synchronized time base for indicating a current time to said processor core in said second machine.

11. The method according to claim 10, further comprising:
synchronizing said first machine to said second machine;
determining an elapsed time that occurred during said transmission logical partition from said first machine to said second machine; and adjusting said second virtualized time base utilizing said elapsed time by adding said elapsed time to said time base offset.

12. A method for providing virtualized time base in a logically partitioned data processing system, said method comprising: determining a time base for each one of a plurality of processor cores, said time base being used to indicate a current time to each one of said plurality of processor cores for which said time base is determined; synchronizing said time bases together for said plurality of processor cores wherein each one of said plurality of processor cores includes its own copy of a synchronized time base; generating, for one of said plurality of processor cores, a virtualized time base that is different from said synchronized time base but that remains synchronized with at least a portion of said synchronized time base; utilizing, by said one of said plurality of processor cores, said virtualized time base instead of said synchronized time base for indicating said current time to said one of said plurality of processor cores; said virtualized time base and said portion of said synchronized time base remaining in synchronization together; identifying a next logical partition to be executed by a particular one of said plurality of processor cores; identifying a first time base offset for said next logical partition; determining a second time base offset for a previous logical partition that just finished being executed by said particular one of said plurality of processor cores; determining a difference between said first time base offset and said second time base offset; determining a second virtualized time base for said particular one of said plurality of processor cores by modifying first bits of said second virtualized time base wherein said first bits represent said difference.

13. The method according to claim 12, further comprising:
executing a machine check in said particular one of said plurality of processor cores;
restoring the synchronized time base for said particular one of said plurality of processor cores from a time-of day register that is maintained by a chip that includes said particular one of said plurality of processor cores;
said second time base offset being unknowable after said machine check occurs;
determining a second difference between said first time base offset and said synchronized time base that was restored from said time-of-day register
determining a third virtualized time base for said particular one of said plurality of processor cores by modifying first bits of said third virtualized time base wherein said first bits represent said second difference.

* * * * *